J. A. C. & A. S. HICKMAN.
Corn-Planter.
No. {2,193, 33,197.}
Patented Sept. 3, 1861.
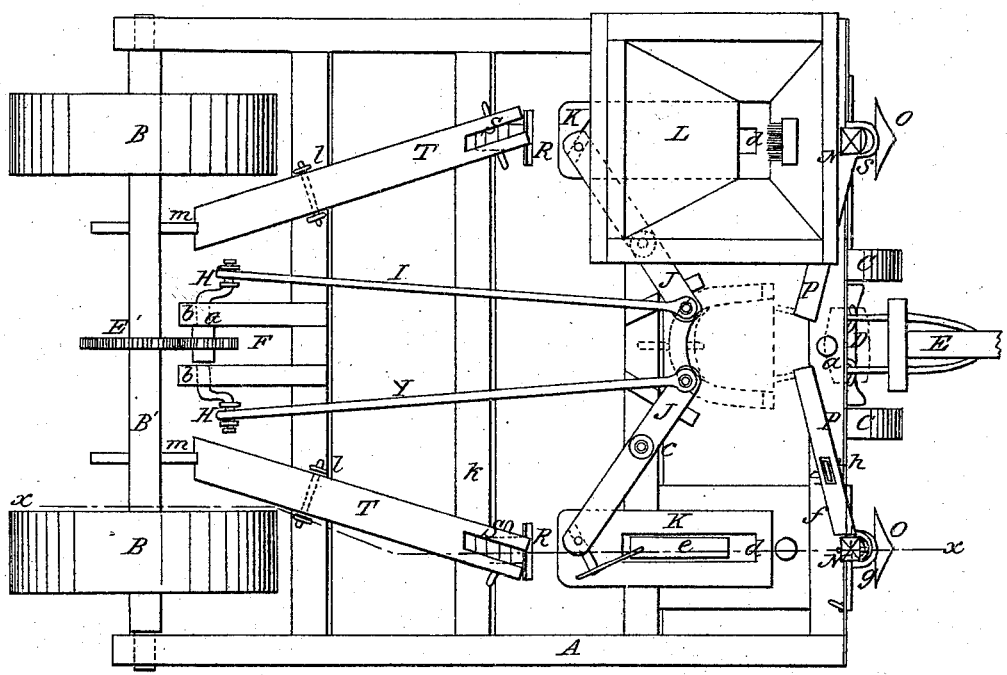
Witnesses:
Inventor:

the rods I are disconnected from the levers J

UNITED STATES PATENT OFFICE.

J. A. C. HICKMAN AND A. S. HICKMAN, OF SUMMERFIELD, ILLINOIS.

IMPROVEMENT IN CORN-PLANTERS.

Specification forming part of Letters Patent No. 33,197, dated September 3, 1861.

*To all whom it may concern:*

Be it known that we, J. A. C. HICKMAN and A. S. HICKMAN, of Summerfield, in the county of St. Clair and State of Illinois, have invented a new and Improved Corn-Planter; and we do hereby declare that the following is a full, clear, and exact description of the same, reference being had to the accompanying drawings, making a part of this specification, in which—

Figure 1 is a plan or top view of our invention; Fig. 2, a side sectional view of the same, taken in the line $x\ x$, Fig. 1.

Similar letters of reference indicate corresponding parts in the two figures.

To enable those skilled in the art to fully understand and construct our invention, we will proceed to describe it.

A represents a rectangular frame, the back part of which is supported by two wheels, B B, the front part of said frame being supported by two smaller wheels, C C, the axle D of which is attached to the frame by a king-bolt, $a$, to admit of its turning.

E is a draft-pole attached to axle D.

The axle B' of the wheels B B is allowed to turn freely in the frame A, and one of the wheels B is permanently attached to the axle, while the other is fitted loosely on it.

On the axle D there is secured a toothed wheel, E', which gears into a pinion, F, on a shaft, G, the latter being fitted on suitable bearings, $b\ b$, on the frame A, and having a crank, H, at each end. To each crank H there is attached a rod, I, and the front ends of these rods are connected to the inner ends of levers J J, which have their fulcra $c\ c$ on the front part of the frame A. The outer ends of the levers J J are connected to slides K K, which are placed horizontally at the bottoms of hoppers L L and are allowed to work freely beneath them. The slides K are each provided with an oblong slot, $d$, and in each slot $d$ an adjustable slide, $e$, is placed, for the purpose of varying the capacity of the seed-cells, which are at the outer parts of the slots $d$.

In the front part of the frame A there are placed two tubes, M M, one just in front of each hopper L, and in line with the seed cells or slots $d$, and to the front cross-bar, $f$, of frame A there are attached two upright bars, N N, said bars N being fitted in guides $g\ g$ and allowed to slide freely up and down therein. A bar, N, is placed directly in front of each tube M, and to the lower end of each bar N a furrow-share, O, is secured.

P P are levers, which have their fulcra $h\ h$ on the cross-bar $f$. The outer ends of these levers are connected to the bars N N, one to each, and the inner ends of the levers are directly in front of the driver's seat Q. The driver therefore at any time may elevate the furrow-shares O by simply depressing the inner ends of the levers P P with his feet. The depth of the furrows made by the shares O may be regulated by pins $i$, which pass through the bars N.

R R are the covering shares, which are secured to the lower ends of bars S S, said bars being fitted in guides $j$, which are attached to the cross-bar $k$ of the frame A. The bars S S are allowed to move up and down freely in their guides $j\ j$, and the upper end of each bar S is attached to a lever, T, said levers having their fulcra at $t\ t$. The outer ends of the levers T T extend outward within the path of rotation of pins or tappets $m\ m$, which project through the axle B. The depth of the penetration of the shares R R may be regulated by pins $n\ n$, which pass through the bars and rest on one of the guides $j$.

The operation is as follows: As the implement is drawn along the slides K have a reciprocating movement communicated to them through the medium of the levers J J, rods I I, and gearing E' F, the seed-cells $d$, at the termination of each forward movement of the slides K, discharging their seed into the tubes M. The droppings may be made at a greater or less distance apart by varying the size of the wheels E' F. The seed is covered by the elevation of the shares R R, which is effected at the proper time by the action of the pins $m\ m$ on the back ends of the levers T T. The shares R, each time they rise, leave the earth in front of them directly on the seed. The shares R drop by their own gravity as the pins or tappets $m\ m$ leave the ends of the levers T. The levers P P are each acted upon by a spring, $o$, underneath their inner ends, and these springs have a tendency to keep the shares O down into the ground.

In moving the machine from place to place the rods I are disconnected from the levers J J, and the covering-shares R R and furrow-shares O elevated above the surface of the ground by means of the pins $n$ $g$.

The device as a whole is extremely simple and efficient, and there are no parts liable to become deranged by use.

We do not claim the reciprocating seed-slides K, for they have been previously used; but We do claim as new and desire to secure by Letters Patent—

The combination and arrangement of the gearing E' F, cranks H H, rods I I, tappets $m$ $m$, and levers J J and T T, as shown and described, for operating the reciprocating seed-slides K K and coverers R R from the axle B'.

J. A. C. HICKMAN.
A. S. HICKMAN.

Witnesses:
THOMAS TOPPING,
J. C. POWER.